United States Patent
Hwang et al.

[11] Patent Number: 6,130,762
[45] Date of Patent: Oct. 10, 2000

[54] PAPER ADVANCE MECHANISM AND PRINTER USING THE SAME

[75] Inventors: Der-Chen Hwang, Taipei County; Jui-Kuang Tu, Taipei; Chia-Tsui Lan, Taoyuang County; Chien-Tsung Ho; Hsi-Tien Tang, both of Taipei County, all of Taiwan

[73] Assignee: Destiny Technology Corp., Taipei, Taiwan

[21] Appl. No.: 09/090,316

[22] Filed: Jun. 4, 1998

[51] Int. Cl.⁷ .............................. B65H 29/00; B65H 5/00; H04N 1/00; H04N 1/04
[52] U.S. Cl. ........................ 358/498; 358/496; 358/408; 358/401; 271/225; 271/184; 271/186; 271/902
[58] Field of Search ..................... 358/498, 401, 358/408, 496; 271/225, 184, 186, 902

[56] References Cited

U.S. PATENT DOCUMENTS

| | | | |
|---|---|---|---|
| 4,457,506 | 7/1984 | Ashbee et al. | 371/3.1 |
| 5,055,946 | 10/1991 | Kurahashi et al. | 358/498 |
| 5,534,902 | 7/1996 | Hoesly | 347/104 |
| 5,751,448 | 5/1998 | Kim et al. | 358/498 |
| 5,760,919 | 6/1998 | Acquaviva et al. | 358/450 |
| 5,836,706 | 11/1998 | Ruhe | 400/636 |
| 6,015,148 | 1/2000 | Cho | 271/164 |
| 6,042,109 | 3/2000 | Klausbruckner | 271/225 |

*Primary Examiner*—Edward L. Coles
*Assistant Examiner*—Coulter Henry
*Attorney, Agent, or Firm*—Bacon & Thomas, PLLC

[57] ABSTRACT

A paper advance mechanism which minimizes the size of a printer includes a printer head and a platen disposed below the printer head and separated from the printer head by a gap. A first channel defined by the platen and a chassis is in the form of an arc for guiding a sheet from a paper cassette to advance along the chassis and towards the printer head while the platen is rotating in a first direction. A pair of driving rollers is disposed close to the gap for controlling the moving direction of the sheet. A second channel in communication with the first channel guides the sheet from the first channel, and a third channel in communication with and horizontally aligned with the second channel guides the sheet from the second channel to a paper exit opening. The printer had prints on the sheet when the sheet is advancing from the second channel to the third channel. After printing is finished, the sheet is fed back to the second channel for retrieval.

3 Claims, 5 Drawing Sheets

PAPER ADVANCE MECHANISM AND PRINTER USING THE SAME

BACKGROUND OF THE INVENTION

1. Field of the Invention

The present invention relates generally to a paper advance mechanism and a printer using the same.

2. Description of the Prior Art

FIG. 4 shows a cross-sectional view of a conventional printer. As shown in FIG. 4, a separate paper roller 63 moves a sheet from a drawer to a gap 69 defined between a guide 65 and a paper feed roller 68 which is rotated to advance the sheet through a channel 70 defined between the guide 65 and a guide 66 to two driving rollers 64. The two driving rollers 64 move the sheet in a direction from the channel 70 to a gap 71 defined between a printer head 61 and a platen 62 so that the printer head 61 prints image on the sheet on the platen 62. After the sheet is printed, the driving rollers 64 move the sheet in an opposite direction from the gap 71 along the channel 70 and a channel 72 defined between the guide 66 and a guide 67.

FIG. 5 shows a cross-sectional view of another conventional printer. As shown in FIG. 5, this printer has a path change plate 88 including an end resting on a guide 85 and an opposite end pivotably mounted on an end of a guide 87. In this printer, a sheet advanced by an individual paper roller 83 is initially moved along an inclined surface of the guide 85, and then push away the path change plate 88 to reach two driving rollers 84 by way of a channel 89 defined between the guide 85 and a guide 86. The driving rollers 84 move the sheet in a direction from the channel 89 to a gap 90 defined between a printer head 81 and a platen 82 such that the printer head 81 prints image on the sheet on the platen 82. After the sheet is printed, the driver rollers 84 move it in an opposite direction from the gap 90 along the channel 89 and a channel 91 defined between the guide 86 and the path change plate 88 and a guide 87.

The printer shown in FIG. 4 uses the paper feed roller 68 as well as the guides 65–67 so as to change paper path, and the printer shown in FIG. 5 uses the path change plate 88 as well as the guides 85–86 so as to change paper path. Such mechanisms for changing paper path entail disadvantages in complicated structure and tough assembly.

SUMMARY OF THE INVENTION

It is an object of the present invention to provide a structurally simple paper advance mechanism which can change paper path and permit a printer using the same to be assembled easily.

It is another object of the present invention to provide a small-in-size printer using a simple-in-structure paper advance mechanism.

A paper advance mechanism in accordance with the present invention includes a first roller which advances a sheet from a drawer. A first channel is located near the first roller for receiving the sheet from the first roller. A second channel is in communication with the first channel for receiving the sheet from the first channel. A third channel is in communication with the second channel thus allowing movement of the sheet from the second channel into the third channel and preventing movement of the sheet from the second channel into the first channel. Two second rollers are located in the vicinity of the second channel for receiving the sheet from the second channel and for moving the sheet in two opposite directions.

In addition, the first, second and third channels are joined together at a point between the second and third channel.

Moreover, the aforementioned paper advance mechanism is used in a printer.

A printer in accordance with the present invention includes a printer head and a platen which is located opposite to the printer head. A gap is defined between the printer head and the platen. A first roller advances a sheet from a cassette. A first channel is located near the first roller for receiving the sheet from the first roller. A second channel is in communication with the first channel for receiving the sheet from the first channel. A third channel is in communication with the second channel so that the sheet can only be moved from the second channel into the third channel instead of the first channel. Two second rollers are located in the vicinity of the second channel for receiving the sheet from the second channel and for moving the sheet in two opposite directions. In addition, in such a printer, the sheet is moved between the second rollers before it is moved through the gap when it is moved from the first channel into the second channel.

A printer in accordance with the present invention includes a printer head and a platen which is located opposite to the printer head. A gap is defined between the printer head and the platen. A first roller advances a sheet from a cassette. A chassis is located near the platen thus defining a first channel for receiving the sheet from the first roller. A second channel is in communication with the first channel for receiving the sheet from the first channel. A third channel is in communication with the second channel so that the sheet can only be moved from the second channel into the third channel instead of the first channel. Two second rollers are located in the vicinity of the second channel for receiving the sheet from the second channel and for moving the sheet in two opposite directions. In addition, in such a printer, the sheet is moved through the gap before it is moved between the second rollers when it is moved from the first channel into the second channel. Moreover, the sheet is moved between the second rollers before it is moved into the second channel when it is moved from the first channel into the second channel.

The implementation of the present invention will be further illustrated with the following preferred embodiments made with reference to the accompanied drawings.

DESCRIPTION OF THE PREFERRED EMBODIMENT

Figure 1:
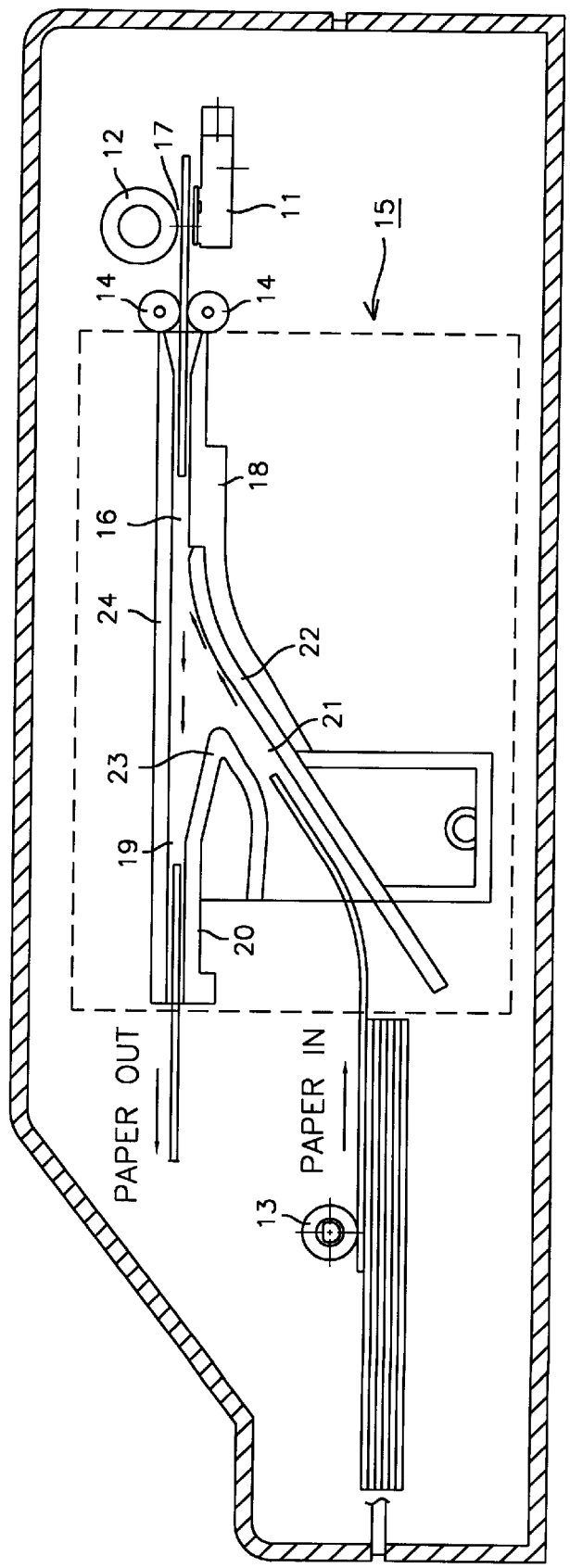
FIG. 1 is a cross-sectional view of a printer according to a first embodiment of the present invention.

Referring to FIG. 1, a cross-sectional view of a printer using a paper advance mechanism according to a first embodiment of the present invention is shown. The printer according to the first embodiment includes a printer head 11 and a platen 12 which is located opposite to the printer head 11 thus defining a gap 17. A separate paper roller 13 is disposed in an upstream place along a paper flow direction for advancing a sheet from a cassette. A channel block 15 is disposed between the separate paper roller 13 and the gap 17 and has a substantially rectilinear first channel 21 defined between a guide 22 and a separator 20 for receiving the sheet from the separate paper roller 13. A second channel 16 is defined between two guides 18 and 24 and in communication with the first channel 21 for receiving the sheet from the first channel 21. A third channel 19 is defined between the guide 24 and the separator 20, and is in alignment and communication with the second channel 16. The first channel 21 is in communication with the second channel 16 and third channel 19 at a angle. Two driving rollers 14 are disposed between the channel block 15 and the gap 17 for receiving the sheet from the second channel 16 and for moving the sheet in two opposite directions.

The sheet is initially fed into the first channel 21 by the separate paper roller 13. In and along the first channel 21, the sheet is advanced to the second channel 16 and finally to the driver rollers 14. The driver rollers 14 move the sheet in a direction from the second channel 16 to the gap 17 so that the printer head 11 prints image on the sheet on the platen 12, and move the sheet in an opposite direction from the gap 17 to the second channel 16 after the sheet is printed. Due to rigidity of the sheet which keeps the sheet straight and the separator 20 which has a face 23 facing the second channel 16 for guiding the sheet into the third channel 19, the sheet can only be moved from the second channel 16 into the third channel 19 when the sheet passes where the second channel 16, the third channel 19 and the first channel 21 are joined.

Figure 2:
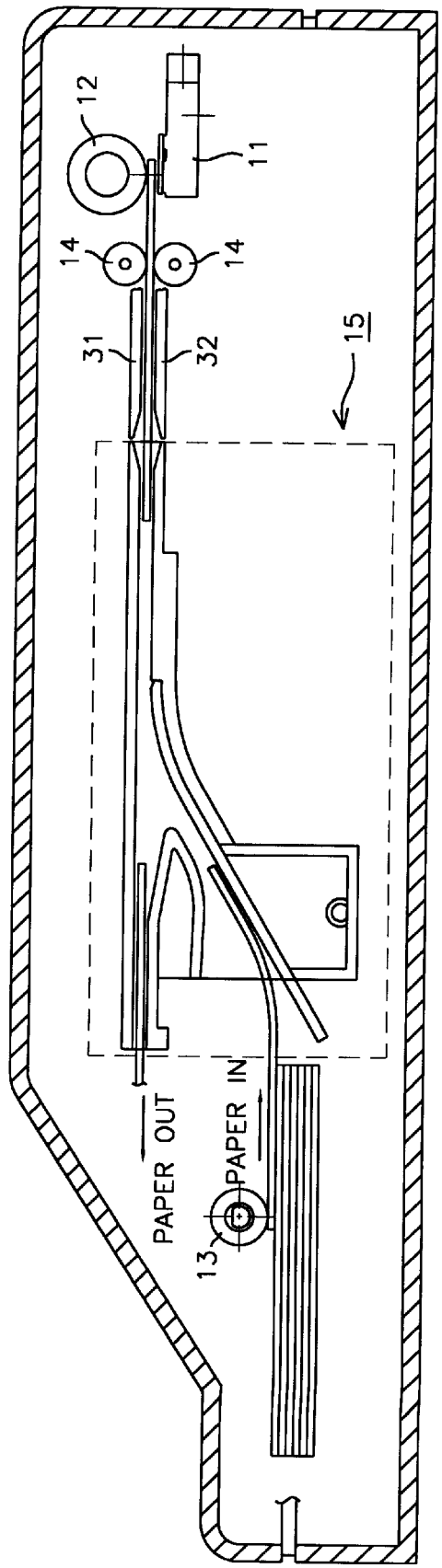
FIG. 2 is a cross-sectional view of a printer according to a second embodiment of the present invention.

It is to be noted, as shown in FIG. 2, if a distance between the individual paper roller 13 and the driving rollers 14 is too long so that there is a gap between the channel block 15 and the driver rollers 14, then two guides 31 and 32 can be disposed between the channel block 15 and the driving rollers 14 thus defining a channel being in alignment and communication with the second channel 16 for receiving the sheet from the second channel 16.

Figure 4:
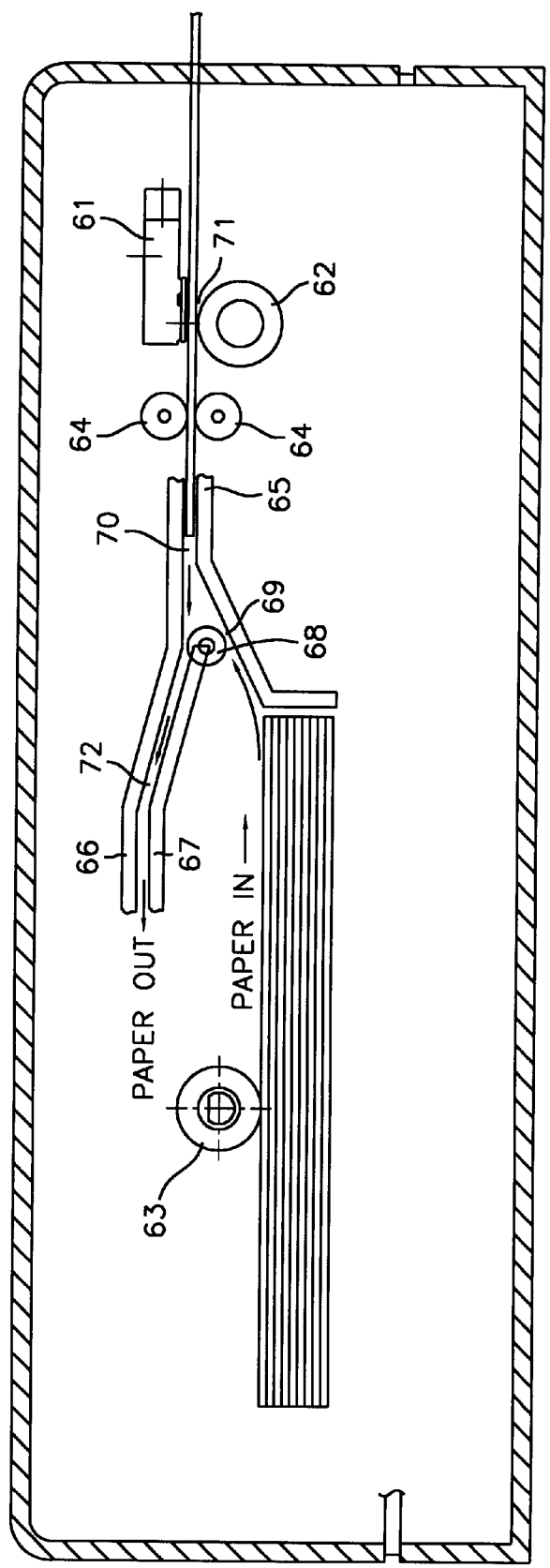
FIG. 4 shows a cross-sectional view of a conventional printer.
Figure 5:
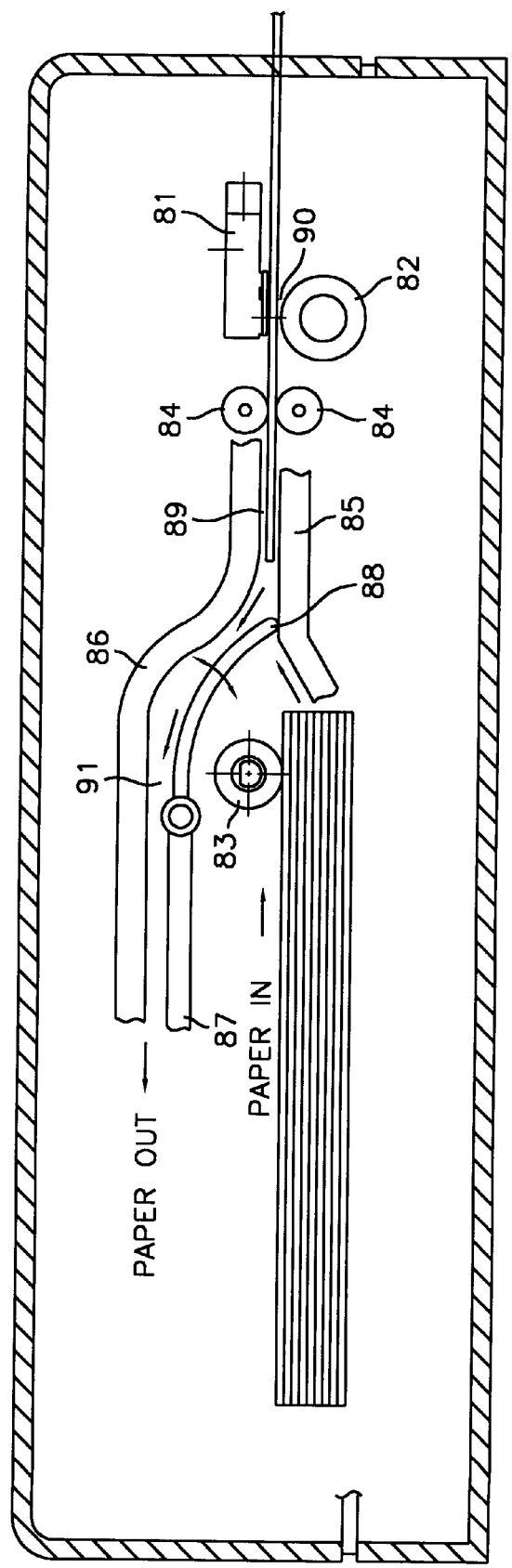
FIG. 5 shows a cross-sectional view of another conventional printer.

Compared with the conventional printers shown in FIG. 4 and 5, the first embodiment includes a structurally simple channel block and is hence easy to assemble.

Figure 3:
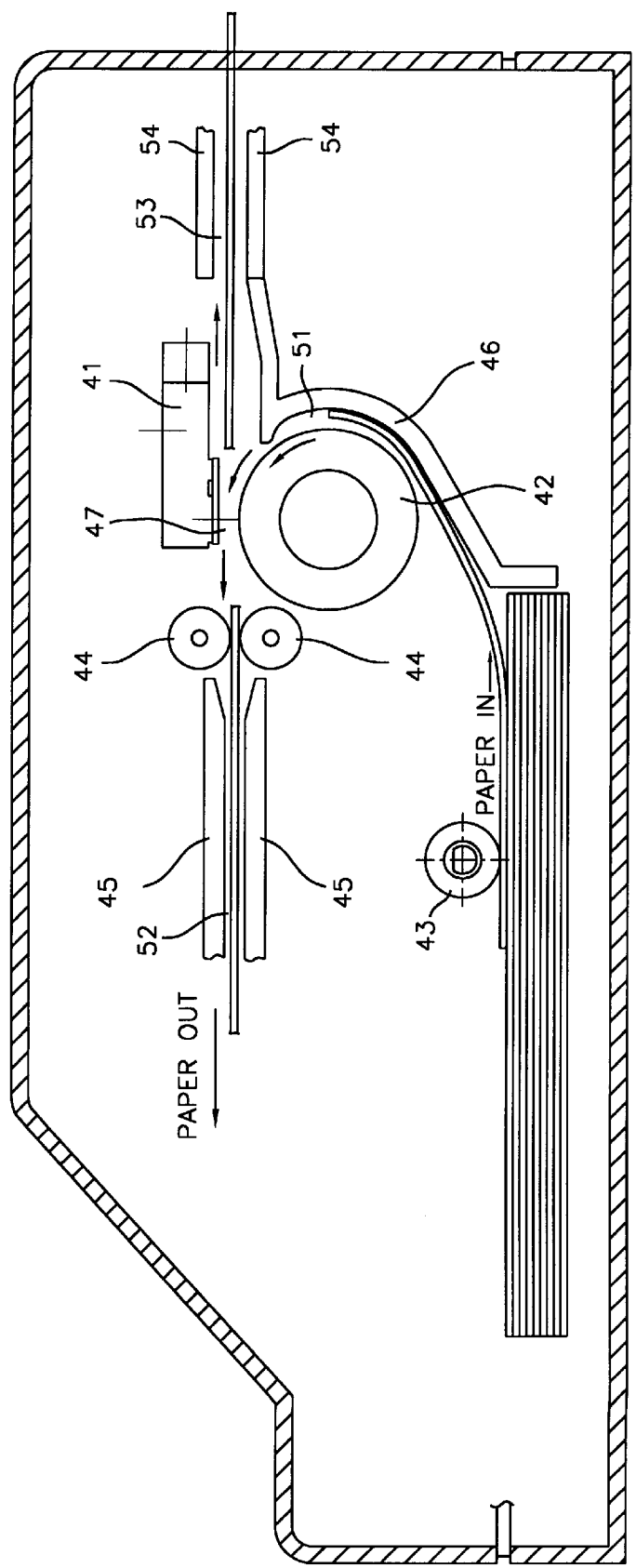
FIG. 3 is a cross-sectional view of a printer according to a third embodiment of the present invention.

FIG. 3 is a cross-sectional view of a printer using a paper advance mechanism according to a second embodiment of the present invention. The printer according to the second embodiment includes a printer head 41 and a platen 42 which is located opposite to the printer head 41 thus defining a gap 47. An individual paper roller 43 is disposed in an upstream place along a paper flow direction for advancing a sheet from a cassette. A chassis 46 is located near the platen 42 thus defining a first channel 51 which is substantially in the form of an arc for receiving the sheet from the individual paper roller 43. A second channel 52 is defined between two guides 45, near one side of the gap 47, in alignment with the gap 47 and in communication with the first channel 51 for receiving the sheet from the first channel 51. A third channel 53 is defined between two guides 54, near the other side of the gap 47 and in alignment and communication with the second channel 52 for receiving the sheet from the second channel 52. The first channel 51, the second channel 52 and the third channel 53 are joined together at a point between the second channel 52 and the third channel 53. Two driver rollers 44 are disposed between the gap 47 and the second channel 52 for receiving the sheet from the second channel 52 and for moving the sheet in two opposite directions.

The sheet is initially fed into the first channel 51 by the separate paper roller 43. The platen 42 is also rotated to move the sheet through the first channel 51 and the gap 47 to the driver rollers 44 which advance the sheet into the second channel 52. Then the driver rollers 44 move the sheet in a direction from the second channel 52 through the gap 47 to the third channel 53 so that the printer head 41 prints image on the sheet on the platen 42, and move the sheet in an opposite direction from the third channel 53 through the gap 47 to the second channel 52 after the sheet is printed.

Compared with the conventional printers shown in FIG. 4 and 5, the printer according to the second embodiment has advantages such as simple structure, easy assembly and small size.

While the present invention has been particularly shown and described with reference to the preferred embodiments thereof, it should be understood by those skilled in the art that various changes in form and detail may be made without departing from the spirit and scope of the invention.

What is claimed is:

1. A paper advance mechanism for a printer, said printer having a housing, a paper cassette at a bottom of the housing, and a roller on top of the paper cassette for advancing a sheet from the paper cassette, comprising:

a printer head;

a platen disposed below the printer head and separated from the printer head by a gap;

a first channel defined by the platen and a chassis, said first channel forming an arc-shaped passage for guiding a sheet from said paper cassette along said chassis and towards said printer head while said platen rotates in a first direction;

a pair of driving rollers disposed close to said gap for controlling a moving direction of said sheet;

a second channel disposed above said paper cassette and in alignment with said gap such that said sheet is guided from said first channel into said second channel while said pair of driving rollers rotates in a first direction; and a third channel disposed on an opposite side of said platen from said second channel, such that gap is situated between said second and third channels, said third channel being horizontally aligned with said gap such that said sheet is guided from said second channel to said third channel while said pair of driving rollers rotate in a second direction, wherein:

said sheet is initially advanced into said gap due to rotation of said platen, said pair of rollers then advances said sheet through said gap into said second channel by rotation in said first direction, said rollers then advance said sheet from said second channel through said gap into said third channel by rotation in said second direction, said printer head being arranged to print on said sheet when said sheet is advanced from said second channel through said gap into said third channel, said rollers then feed said sheet back through said gap to said second channel by rotation in said first direction for retrieval following printing.

2. A paper advance mechanism as claimed in claim 1, wherein said second channel is defined by two guide members.

3. A paper advance mechanism as claimed in claim 1, wherein said third channel is defined by two guide members.

* * * * *